United States Patent [19]

Sakai

[11] Patent Number: 4,689,963
[45] Date of Patent: Sep. 1, 1987

[54] METHOD OF FREEZING FOODS

[76] Inventor: Tadaaki Sakai, 39-8 Yamadanishi 3-chome, Suita-shi, Osaka, Japan

[21] Appl. No.: 881,388

[22] Filed: Jul. 2, 1986

[51] Int. Cl.$^4$ ............................................. F25D 17/02
[52] U.S. Cl. .......................................... 62/64; 62/373; 62/434
[58] Field of Search ...................... 62/63, 64, 373, 434

[56] References Cited

U.S. PATENT DOCUMENTS

| | | | |
|---|---|---|---|
| 671,399 | 4/1901 | Miskolczy | 62/64 |
| 1,641,441 | 9/1927 | Kolbe | 62/64 |
| 1,769,088 | 7/1930 | Vucassovich | 62/63 |
| 1,912,896 | 6/1933 | Hiller | 62/64 |
| 2,286,225 | 6/1942 | Noyes | 62/64 |
| 2,504,217 | 4/1950 | Nelson et al. | 62/373 |
| 3,041,851 | 7/1962 | Stenerson | 62/64 |
| 3,258,935 | 7/1966 | Ross | 62/64 |

Primary Examiner—Ronald C. Capossela
Attorney, Agent, or Firm—Koda and Androlia

[57] ABSTRACT

A method of freezing foods which comprises the step of cooling a heat transfer device having an open top, and the step of bringing articles to be frozen in contact with one surface of the heat transfer device through a layer of brine and keeping the articles in such contact relation. Freezing of the articles progresses only from their respective portions at which they are in contact with the brine.

7 Claims, 2 Drawing Figures

METHOD OF FREEZING FOODS

BACKGROUND OF THE INVENTION

This invention relates to a method of freezing foods and, more particularly, to a freezing method for long time preservation of meats, sea foods, vegetables, and/or other perishable foods as in their fresh condition.

For freezing articles of food it has been generally known to employ a liquid immersion method in which the article is immersed in a brine (or an anti-freezing solution) cooled to a very low temperature, or a liquefied gas method in which a liquefied gas having a low boiling point (such as liquid nitrogen, liquid carbon dioxide, or the like) is sprayed over the article, or in which the article is dipped into the liquefied gas. While conventionally employed in freezing perishable foods, such as meat, fish, and vegetables, these methods have common disadvantages as pointed out below.

In either the liquid immersion method or the liquefied gas method, the entire surface of the article being frozen is cooled to a very low temperature in a short period of time, so that freezing takes place first with the entire surface of the article. This involves the difficulty that once the surface is solidly frozen, an upward volume change which would otherwise result from the freezing of water content of the article during the subsequent interior freezing of the article is prevented, an internal pressure being thus produced within the article. This internal pressure will increase as freezing progresses, and thus may eventually cause cracking to the exterior of the frozen article or lead to disruption of the tissue of the frozen article. Such cracking or tissue disruption may be a cause of dripping when the frozen article is thawed out, thus resulting in a loss of weight and/or deterioration in quality characteristics such as taste and flavor.

Another difficulty is that the brine or liquefied gas in a tank is higher in temperature adjacent its surface at which it is in contact with the atmosphere than at a deeper level, there being a temperature gradient in the height-wise direction of the tank. As such, the freezing conditions vary according to the depth of immersion each individual article to be frozen, which may result in variation in quality among frozen articles. In order to overcome this difficulty, the usual practice is to constantly agitate the brine or liquefied gas in the tank. However, it is impracticable to completely eliminate such temperature gradient or unevenness, since the lower the temperature of such liquid, the greater is its viscosity (which is true more particularly with brine).

Furthermore, aforesaid methods are costly and uneconomical, because they require brine and liquefied gas respectively, both rather expensive, in a large amount.

SUMMARY OF THE INVENTION

Accordingly, it is a primary object of this invention to provide a method of freezing foods which is not liable to cause any loss in food weight or any deterioration in food quality due to freezing.

It is another object of the invention to provide a method of freezing foods which assures uniform quality of any frozen food.

It is a further object of the invention to provide a method of freezing foods which is less expensive to practice and which can be practiced with simple equipment.

It is another object of the invention to provide a method of freezing foods wherein articles of food held in contact with one surface of heat transfer means are not liable to become inseparably adhered to the surface.

It is a still further object of the invention to provide a food freezing method which permits articles of food to be uniformly cooled from one direction even if the articles are different in configuration and if they are not uniformly in contact with one surface of heat transfer means because irregularities are present on their contact surfaces relative to the heat transfer means.

In order to accomplish the above and other objects of the invention which will be apparent from the following description and appended claims, the method in accordance with the invention comprises the step of cooling heat transfer means having an open end, and the step of bringing articles to be frozen in contact with the heat transfer means through a layer of brine present therebetween and keeping the articles in said contact relation, whereby the articles may begin to be frozen only with their respective portions at which they are in contact with the brine. According to this method, freezing starts at the individual article-brine contact portions, then progressing toward the opposite portions of the articles, and therefore development of internal pressure within each article being frozen can be effectively prevented, it being thus possible to eliminate the possibility of the article's tissue being disrupted. Moreover, since individual articles are in contact with one surface of the cooled heat-transfer means, the articles are cooled and frozen first at their such contact surfaces and toward their opposite portions under same conditions, irrespective of their positions at which they are in contact with the heat transfer means, only if the temperature distribution over the heat transfer means is kept uniform. Thus, the articles being frozen are not subject to variation in quality.

It is generally known that where an article of food placed on a tray or the like is frozen, the article is often liable to become inseparable from the tray as any moisture resulting from condensation of airborne vapor becomes frozen at the contact surface between the article and the tray. As such, if the article is brought into direct contact with the heat transfer means, it is likely that the article will be inseparable from the heat transfer means after it is frozen. In this conjunction, therefore, it is necessary that the heat transfer means must be removable from means for cooling the heat transfer means. According to this invention, however, there is no possibility of the article becoming inseparable from the heat transfer means, since a layer of brine is present between the heat transfer means and the article. This means additional advantages as follows. One is that since the article to be frozen is brought in contact with the heat transfer means without any possibility of the former becoming inseparable from the latter, the heat transfer means can be fixedly disposed, which means a reduced cost of equipment. Another additional advantage is that the heat transfer means may be cooled by using well-known inexpensive means and without using such expensive medium as brine. For example, a pipe for flow of a refrigerant such as Freon gas is placed on the back of the heat transfer means and in contact therewith so that the heat transfer means may be cooled through the wall of the pipe. Furthermore, the amount of brine placed in a laminar pattern between the article to be frozen and the heat transfer means may be very small, which means considerable economy in the cost involved in practicing the method of the invention.

According to an advantageous development of the invention, if any irregularities which may not allow uniform contact between articles to be frozen and the heat transfer means are present on the contact surfaces of the articles, the thickness of the layer of brine is increased so that the irregularities may be submerged in the layer of brine, whereby it is possible to allow the articles to be cooled and frozen first with the entirety of the contact surfaces. Such arrangement provides an advantage that any quality deterioration which would otherwise be caused to the articles as a result of non-uniform cooling or any prolongation of time requirements for freezing can be effectively prevented.

BRIEF DESCRIPTION OF THE DRAWINGS

FIG. 1 is a perspective view of the apparatus with no heat insulation material shown; and FIG. 2 is a sectional view thereof.

DETAILED DESCRIPTION OF THE INVENTION

One example of the method according to the invention will now be described with reference to the accompanying drawings.

Figure 1:
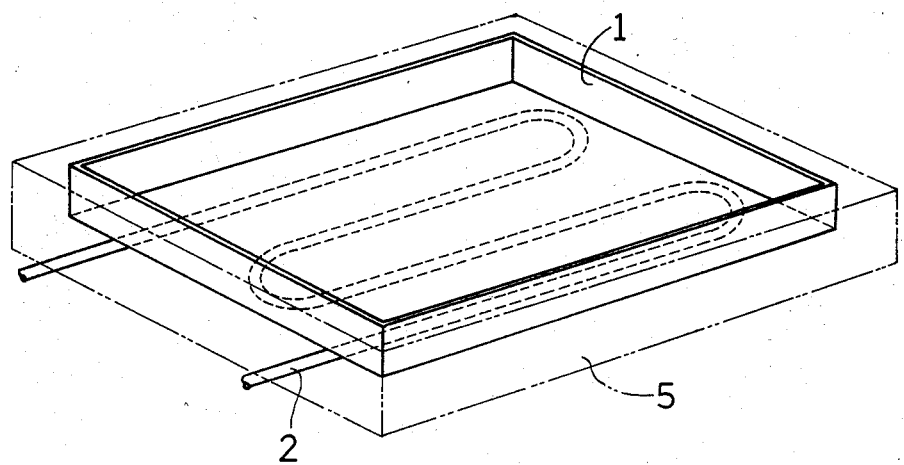
FIGS. 1 and 2 illustrate one embodiment of an apparatus to be used in practicing the method in accordance with the invention.
Figure 2:
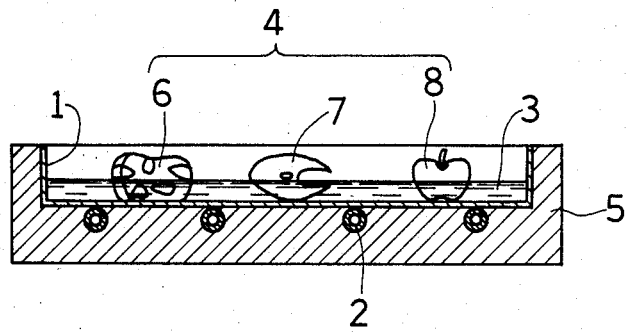

In FIGS. 1 and 2, numeral 1 designates a heat transfer device which, in the present instance, is a shallow metallic tank with its top side open. Numeral 2 is a pipe through which a refrigerant for cooling the tank 1 is caused to flow. Any known refrigerant, such as cooled brine, low-boiling-point liquefied gas, or Freon gas, may be used. Both the tank 1 and the pipe 2 are constructed of a metal having good heat conductivity, such as copper, and are kept in close contact with each other by welding or otherwise so that heat conduction between the pipe 2 and the tank 1 may be facilitated.

Numeral 3 designates brine placed in a small amount within the tank 1, numeral 4 designates articles to be frozen which are placed on the bottom of the tank 1 and are submerged only at their lower portions in the brine 3, and numeral 5 is a heat insulation member mounted to the tank 1 so as to cover the outer wall of the tank 1.

The tank 1 is cooled first by the refrigerant which flows through the pipe 2, and then the brine 3 is cooled. The articles 4 are cooled and frozen by the so cooled brine 3. Freezing starts only at the portions of the articles 4 which are submerged in the brine 3 and then progresses upward. Since freezing progresses gradually from the lower part of each article 4 and toward the upper portion thereof, there is no possibility of internal pressure developing within the article 4.

In the present example, the amount of brine 3 placed in the tank 1 is a quantity such that only the lower portion of the article 4 is submerged in the brine 3, or such that the surface of the brine 3 is at a level corresponding to approximately one half the height of the article 4. Generally, such half height is preferably 5-10 mm. If the amount of brine 3 exceeds this height range, the articles 4 each may be frozen initially with the entire surface thereof as in the case with the liquid immersion method, and accordingly internal pressure may develop within the interior of the article 4. The upper limit for the amount of brine used is generally as above shown, but it is noted that it varies more or less depending upon the configuration of the article 4 to be frozen. Preferably, therefore, the amount of brine should be on the smaller side for caution's sake. At same time, it is noted that if the amount of brine 3 is a little too small, the time requirement for freezing is longer. Therefore, the amount of brine 3 should be determined so that these two considerations may be well reconciled. In any case, there is no possibility of any temperature gradient developing in the brine 3, since the amount of brine 3 used is small.

The amount of brine 3 must be sufficient to form a thin layer thereof on the bottom of the tank 1. Without such thin layer, it may not be possible to separate each article 4 from the bottom of the tank 1 after the article 4 has been frozen. For such separation purposes, it is even acceptable that brine is simply coated on the bottom of the tank 1 in a laminar pattern. It is noted that there is no particular limitation as to the type of brine to be used: an optimal type of brine may be used depending upon the nature of the article 4 to be frozen and the freezing temperature or the like.

The method in accordance with the present invention is such that articles 4 to be frozen are placed on the bottom of a cooled tank 1 containing a small amount of brine 3 and are withdrawn after a predetermined period of time. It is characterized in that each article 4 is cooled initially at the portion thereof which is in contact with the brine 3 so that freezing may progress from that portion and upward. The heat transfer device is not limited to the tank 1 as above described: it may comprise a plurality of metal trays arranged in parallel on a cooled metal plate. In this case, a small amount of brine is put in each tray.

The temperature of cooled brine 3 may be advantageously set within a general temperature range, e.g., $-30°$ to $-50°$ C. The cooling time for the article 4 to be frozen varies depending upon the type and amount of brine put in the tank 1, the kind, size, or configuration of the article 4, but generally it is approximately 1-2 hours.

Experiments were conducted by using, as articles 4 to be frozen, meat 6, fish meat 7, vegetables and fruits 8, "tofu" having a large water content, and other food items. Several months after they were frozen, all the articles were found as having retained their original fresh condition, each with its tissue remained undisrupted.

Articles 4 to be frozen are usually placed on the bottom of the tank 1 in such condition as they are wrapped with film, in same manner as in the case of the liquid immersion method. For packaging purposes, a film having good freeze resistance, good oil resistance, and good water- and air-sealing characteristics is used.

This invention is directed particularly to the freezing of perishable foods, preservation of which in frozen state is generally difficult, but of course it is equally applicable to all other kinds of food.

What is claimed is:

1. A method of freezing food articles which comprises the step of cooling heat transfer means having an open end, and the step of bringing the food articles to be frozen in contact with one surface of the heat tranfer means through a layer of brine present therebetween and keeping the food articles in said contact relation, whereby the food articles may begin to be frozen only with their respective portions at which they are in contact with the brine.

2. A method as set forth in claim 1 wherein said heat transfer means is a shallow metal tank, articles to be frozen being in contact with and provided on the bottom of the tank.

3. A method as set forth in claim 2 wherein brine is in the bottom of the tank and in a thin laminar pattern.

4. A method as set forth in claim 2 wherein brine is placed in said tank in an amount enough to allow a lower portion of each article placed on the bottom of the tank to be submerged in the brine.

5. A method as set forth in claim 2 wherein brine is placed in said tank in an amount enough to allow submersion into the brine of any irregularity present on the contact surface of each article placed on the bottom of the tank.

6. A method as set forth in any one of claims 1 to 5 wherein cooling of the tank is carried out by causing a refrigerant to flow through a pipe disposed on the back of the bottom of said tank and in close contact therewith.

7. A method as set forth in claim 1 wherein said heat transfer means are shallow metal trays, articles to be frozen being in contact with and provided on the bottom of each of the trays.

* * * * *